(12) United States Patent
Annan et al.

(10) Patent No.: US 9,413,839 B2
(45) Date of Patent: Aug. 9, 2016

(54) TRAFFIC MANAGEMENT OF THIRD PARTY APPLICATIONS

(75) Inventors: Brandon C. Annan, Westwood Hills, KS (US); John E. Belser, Olathe, KS (US); Tammy M. Otten, Bonner Springs, KS (US); Ryan P. Sullivan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 643 days.

(21) Appl. No.: 13/563,709

(22) Filed: Jul. 31, 2012

(65) Prior Publication Data

US 2014/0036697 A1    Feb. 6, 2014

(51) Int. Cl.
| | | |
|---|---|---|
| H04L 29/08 | (2006.01) | |
| H04W 4/20 | (2009.01) | |
| H04W 24/08 | (2009.01) | |
| H04M 1/725 | (2006.01) | |
| H04L 12/26 | (2006.01) | |
| H04L 12/801 | (2013.01) | |
| H04L 12/823 | (2013.01) | |

(52) U.S. Cl.
CPC .............. *H04L 67/28* (2013.01); *H04L 67/22* (2013.01); *H04W 4/20* (2013.01); *H04L 43/10* (2013.01); *H04L 47/14* (2013.01); *H04L 47/32* (2013.01); *H04M 1/72569* (2013.01); *H04W 24/08* (2013.01)

(58) Field of Classification Search
CPC ..... G06F 9/46; G06F 15/173; H04L 43/0876; H04W 24/00; H04W 52/02; H04W 52/0209
See application file for complete search history.

(56) References Cited

U.S. PATENT DOCUMENTS

| | | |
|---|---|---|
| 5,950,200 A | 9/1999 | Sudai et al. |
| 6,064,975 A | 5/2000 | Moon et al. |
| 6,186,553 B1 | 2/2001 | Phillips et al. |
| 6,356,838 B1 | 3/2002 | Paul |
| 6,441,831 B1 | 8/2002 | Abramowitz et al. |
| 6,622,016 B1 | 9/2003 | Sladek et al. |
| 6,647,260 B2 | 11/2003 | Dusse et al. |
| 6,882,290 B2 | 4/2005 | French et al. |

(Continued)

FOREIGN PATENT DOCUMENTS

| | | |
|---|---|---|
| WO | 2009056148 A1 | 5/2009 |
| WO | 2014022446 A1 | 2/2014 |

OTHER PUBLICATIONS

Notice of Allowance dated Jun. 4, 2013, U.S. Appl. No. 13/023,486, filed Feb. 8, 2011.

(Continued)

*Primary Examiner* — Andrew Lai
*Assistant Examiner* — Leon Andrews

(57) ABSTRACT

A proxy server for routing traffic between a mobile device and a network, comprising at least one processor, a memory, and a traffic monitoring application stored in the memory that, when executed by the at least one processor, monitors a plurality of mobile device installed applications that run on the mobile device and the mobile device installed applications' traffic, analyzes traffic usage for the mobile device installed applications, identifies the mobile device installed applications responsible for traffic that is excessive or unnecessary as determined by the mobile device's service provider, and blocks, delays, or reports the excessive and unnecessary traffic without interrupting the mobile device's communications.

19 Claims, 7 Drawing Sheets

(56) References Cited

U.S. PATENT DOCUMENTS

| | | |
|---|---|---|
| 6,978,132 B1 | 12/2005 | Sladek et al. |
| 6,986,107 B2 | 1/2006 | Hanggie et al. |
| 7,031,437 B1 | 4/2006 | Parsons et al. |
| 7,046,998 B2 | 5/2006 | Verma et al. |
| 7,072,653 B1 | 7/2006 | Sladek et al. |
| 7,073,130 B2 | 7/2006 | Novak et al. |
| 7,215,754 B1 | 5/2007 | Woodson et al. |
| 7,260,382 B1 | 8/2007 | Lamb et al. |
| 7,260,386 B1 | 8/2007 | Haldar et al. |
| 7,409,208 B1 | 8/2008 | Clare et al. |
| 7,500,198 B2 | 3/2009 | Mathews et al. |
| 7,552,432 B2 | 6/2009 | Aiba |
| 7,558,953 B2 | 7/2009 | Osthoff et al. |
| 7,681,134 B1 | 3/2010 | Grechishkin et al. |
| 7,702,322 B1 | 4/2010 | Maurya et al. |
| 7,788,593 B1 | 8/2010 | Grechishkin et al. |
| 7,930,636 B2 | 4/2011 | Garbow et al. |
| 7,970,386 B2 | 6/2011 | Bhat et al. |
| 8,012,219 B2 | 9/2011 | Mendez et al. |
| 8,150,962 B1 | 4/2012 | Wolter |
| 8,244,277 B1 | 8/2012 | Cha et al. |
| 8,265,658 B2 | 9/2012 | Issa et al. |
| 8,270,310 B2 | 9/2012 | Raleigh |
| 8,270,941 B2 | 9/2012 | Kenagy et al. |
| 8,315,198 B2 | 11/2012 | Corneille et al. |
| 8,359,016 B2 | 1/2013 | Lindeman et al. |
| 8,468,164 B1 | 6/2013 | Paleja et al. |
| 8,533,605 B1 | 9/2013 | Cha et al. |
| 8,538,398 B2 | 9/2013 | Wilson et al. |
| 8,559,933 B1 | 10/2013 | Delker et al. |
| 8,577,334 B1 | 11/2013 | Smith et al. |
| 8,577,737 B1 | 11/2013 | Amacker et al. |
| 8,583,091 B1 | 11/2013 | Delker et al. |
| 8,589,911 B1 | 11/2013 | Sharkey et al. |
| 8,650,096 B2 | 2/2014 | Van Buskirk et al. |
| 8,819,639 B2 | 8/2014 | Schumacher |
| 8,838,087 B1 | 9/2014 | Delker et al. |
| 8,843,122 B1 | 9/2014 | Wick et al. |
| 8,863,232 B1 | 10/2014 | Tidd |
| 8,954,041 B1 | 2/2015 | Delker et al. |
| 8,972,592 B1 | 3/2015 | Delker et al. |
| 9,043,446 B1 | 5/2015 | Davis et al. |
| 9,123,062 B1 | 9/2015 | Delker et al. |
| 9,189,607 B1 | 11/2015 | Wick et al. |
| 2002/0029169 A1 | 3/2002 | Oki et al. |
| 2002/0054086 A1 | 5/2002 | Van Oostenbrugge et al. |
| 2002/0054150 A1 | 5/2002 | I'Anson et al. |
| 2002/0101444 A1 | 8/2002 | Novak et al. |
| 2002/0123335 A1 | 9/2002 | Luna et al. |
| 2002/0142760 A1 | 10/2002 | Gidron et al. |
| 2002/0167542 A1 | 11/2002 | Florin |
| 2003/0233329 A1 | 12/2003 | Laraki et al. |
| 2004/0044752 A1 | 3/2004 | Hamaguchi et al. |
| 2004/0113940 A1 | 6/2004 | Brockway et al. |
| 2004/0148598 A1 | 7/2004 | Kita et al. |
| 2004/0171375 A1 | 9/2004 | Chow-Toun |
| 2004/0179034 A1 | 9/2004 | Burritt |
| 2004/0181678 A1 | 9/2004 | Lee et al. |
| 2004/0203941 A1 | 10/2004 | Kaplan et al. |
| 2004/0216054 A1 | 10/2004 | Mathews et al. |
| 2005/0050474 A1 | 3/2005 | Bells et al. |
| 2005/0055696 A1* | 3/2005 | Betzler et al. ............... 718/100 |
| 2005/0071780 A1 | 3/2005 | Muller et al. |
| 2005/0085272 A1 | 4/2005 | Anderson et al. |
| 2006/0048141 A1 | 3/2006 | Persson et al. |
| 2006/0085751 A1 | 4/2006 | O'Brien et al. |
| 2006/0092861 A1 | 5/2006 | Corday et al. |
| 2006/0150256 A1 | 7/2006 | Fanton et al. |
| 2006/0190569 A1 | 8/2006 | Neil et al. |
| 2006/0235760 A1 | 10/2006 | Sanjar et al. |
| 2006/0258289 A1 | 11/2006 | Dua |
| 2006/0277469 A1 | 12/2006 | Chaudhri et al. |
| 2007/0067738 A1 | 3/2007 | Flynt et al. |
| 2007/0088851 A1 | 4/2007 | Levkovitz et al. |
| 2007/0109580 A1 | 5/2007 | Yoshida |
| 2007/0130156 A1 | 6/2007 | U. Tenhunen et al. |
| 2007/0265023 A1 | 11/2007 | Bengtsson et al. |
| 2007/0268842 A1 | 11/2007 | Wang |
| 2007/0282914 A1 | 12/2007 | Sivapragasam et al. |
| 2008/0010133 A1 | 1/2008 | Pyhalammi et al. |
| 2008/0034309 A1 | 2/2008 | Louch et al. |
| 2008/0092057 A1 | 4/2008 | Monson et al. |
| 2008/0192714 A1 | 8/2008 | Kim et al. |
| 2008/0214172 A1 | 9/2008 | Anwer |
| 2008/0276182 A1 | 11/2008 | Leow |
| 2008/0305775 A1 | 12/2008 | Aaltonen et al. |
| 2008/0319887 A1 | 12/2008 | Pizzi et al. |
| 2009/0017870 A1 | 1/2009 | An |
| 2009/0077495 A1 | 3/2009 | Bhat et al. |
| 2009/0181716 A1 | 7/2009 | Benco et al. |
| 2009/0186651 A1 | 7/2009 | You |
| 2009/0228824 A1 | 9/2009 | Forstall et al. |
| 2009/0254753 A1 | 10/2009 | De Atley et al. |
| 2009/0260004 A1 | 10/2009 | Datta et al. |
| 2009/0288079 A1 | 11/2009 | Zuber et al. |
| 2009/0291674 A1 | 11/2009 | Choi |
| 2009/0307679 A1 | 12/2009 | Lee et al. |
| 2010/0005196 A1 | 1/2010 | Wolff-Petersen |
| 2010/0030901 A1 | 2/2010 | Hallberg et al. |
| 2010/0037204 A1 | 2/2010 | Lin et al. |
| 2010/0058431 A1 | 3/2010 | McCorkendale et al. |
| 2010/0060549 A1 | 3/2010 | Tsern |
| 2010/0087175 A1 | 4/2010 | Roundtree |
| 2010/0115438 A1 | 5/2010 | Chu |
| 2010/0121567 A1 | 5/2010 | Mendelson |
| 2010/0184422 A1 | 7/2010 | Ahrens |
| 2010/0190478 A1 | 7/2010 | Brewer et al. |
| 2010/0197219 A1 | 8/2010 | Issa et al. |
| 2010/0234051 A1 | 9/2010 | Holden et al. |
| 2010/0269107 A1 | 10/2010 | Jung et al. |
| 2010/0281427 A1 | 11/2010 | Ghosh et al. |
| 2011/0034160 A1 | 2/2011 | Corda et al. |
| 2011/0072121 A1 | 3/2011 | Takasugi et al. |
| 2011/0161149 A1 | 6/2011 | Kaplan |
| 2011/0161484 A1* | 6/2011 | Van den Bogaert ............. H04L 43/0876 709/224 |
| 2011/0210933 A1 | 9/2011 | Forstall |
| 2011/0238496 A1 | 9/2011 | Gurbuxani et al. |
| 2011/0258301 A1 | 10/2011 | McCormick et al. |
| 2011/0295980 A1 | 12/2011 | Aldis et al. |
| 2011/0312387 A1 | 12/2011 | Heo et al. |
| 2011/0314389 A1 | 12/2011 | Meredith et al. |
| 2012/0016735 A1 | 1/2012 | Park et al. |
| 2012/0054022 A1 | 3/2012 | Kosashvili |
| 2012/0072311 A1 | 3/2012 | Khan |
| 2012/0102428 A1 | 4/2012 | Stewart |
| 2012/0102547 A1 | 4/2012 | Fransdonk |
| 2012/0117478 A1 | 5/2012 | Vadde et al. |
| 2012/0155292 A1 | 6/2012 | Zazula et al. |
| 2013/0097654 A1 | 4/2013 | Aciicmez et al. |
| 2013/0275915 A1 | 10/2013 | Wang |
| 2013/0294307 A1* | 11/2013 | Johansson ......... H04W 52/0209 370/311 |
| 2014/0047559 A1 | 2/2014 | Vera et al. |
| 2014/0127662 A1 | 5/2014 | Kron et al. |
| 2014/0173462 A1 | 6/2014 | Mattingly et al. |
| 2014/0298320 A1 | 10/2014 | Xu et al. |

OTHER PUBLICATIONS

Advisory Action dated Apr. 23, 2013, U.S. Appl. No. 12/876,221, filed Sep. 6, 2010.

Notice of Allowance dated Jul. 2, 2013, U.S. Appl. No. 12/876,221, filed Sep. 6, 2010.

Final Office Action dated May 10, 2013 U.S. Appl No. 13/018,083, filed Jan. 31, 2011.

First Action Interview Office Action dated May 6, 2013, U.S. Appl. No. 13/118,058, filed May 27, 2011.

Notice of Allowance dated Apr. 29, 2013, U.S. Appl. No. 13/537,563, filed Jun. 29, 2012.

Notice of Allowance dated Jun. 27, 2013, U.S. Appl. No. 13/161,496, filed Jun. 16, 2011.

(56) References Cited

OTHER PUBLICATIONS

Notice of Allowance dated Aug. 13, 2014, U.S. Appl. No. 14/019,053, filed Sep. 5, 2013.
Office Action dated Sep. 23, 2014, U.S. Appl. No 13/018,083, filed Jan. 31, 2011.
Notice of Allowance dated Oct. 22, 2014, U.S. Appl. No. 13/118,058, filed May 27, 2011.
Pre-Interview Communication dated Aug. 6, 2014, U.S. Appl. No. 13/045,292, filed Mar. 10, 2011.
First Action Interview Office Action dated Oct. 10, 2014, U.S. Appl. No. 13/045,292, filed Mar. 10, 2011.
Pre-Interview Communication dated Aug. 8, 2014, U.S. Appl. No. 13/659,889, filed Oct. 24, 2012.
First Action Interview dated Oct. 15, 2014, U.S. Appl. No. 13/659,889, filed Oct. 24, 2012.
Office Action dated Oct. 10, 2014, U.S. Appl. No. 13/031,123, filed Feb. 18, 2011.
Wick, Ryan A., et al., Patent Application entitled "Mobile Phone Controls Processor" filed Sep. 3, 2014, U.S. Appl. No. 14/476,339.
Final Office Action dated Mar. 20, 2014, U.S. Appl. No. 12/876,220, filed Sep. 6, 2010.
Notice of Allowance dated May 6, 2014, U.S. Appl. No. 12/876,220, filed Sep. 6, 2010.
Pre-Interview Communication dated Mar. 28, 2014, U.S. Appl. No. 14/019,053, filed Sep. 5, 2013.
Final Office Action dated Apr. 3, 2014, U.S. Appl. No. 13/018,083, filed Jan. 31, 2011.
Advisory Action dated Jun. 9, 2014, U.S. Appl. No. 13/018,083, filed Jan. 31, 2011.
Office Action dated Mar. 18, 2014, U.S. Appl. No. 13/118,058, filed May 27, 2011.
Pre-Interview Communication dated Jun. 9, 2014, U.S. Appl. No. 13/271,207, filed Oct. 11, 2011.
Pre-Interview Communication dated Mar. 21, 2014, U.S. Appl. No. 13/537,810, filed Jun. 29, 2012.
Notice of Allowance dated May 18, 2014, U.S. Appl. No. 13/537,610, filed Jun. 29, 2012.
Wick, Ryan A., et al., Patent Application entitled "Mobile Phone Controls Preprocessor" filed Jun. 29, 2012, U.S. Appl. No. 13/537,610.
Foreign Communication From a Related Counterpart Application—International Search Report and Written Opinion, PCT/US2013/052805 Oct. 4, 2013.
Advisory Action dated Aug. 6, 2013, U.S. Appl. No. 13/018,083, filed Jan. 31, 2011.
Final Office Action dated Sep. 10, 2013, U.S. Appl. No. 13/118,058, filed May 27, 2011.
Office Action—Restriction Requirement dated Aug. 26, 2013, U.S. Appl. No. 13/031,123, filed Feb. 8, 2011.
Delker, Jason R., et al., Patent Application entitled "System and Method for ID Platform," filed Sep. 5, 2013, U.S. Appl. No. 14/019,053.
Delker, Jason R., et al., Patent Application entitled "Dynamic Loading, Unloading, and Caching of Alternate Complete Interfaces," filed Sep. 30, 2013, U.S. Appl. No. 14/042,707.
Annan, Brandon C., et al., International Application entitled, "Traffic Management of Third Party Applications", filed Jul. 24, 2013, Serial No. PCT/US13/52805.
Ackerman, Samuel K., "Lecture Slides: Mapping User Interface Design to Culture Dimensions", Aaron Marcus and Associates, Inc., 2001.
Hollister, Sean, "Apple patent app hints at iPod-based phones, Peed 520 turns shades of green, red, blue and yellow," Engadget, http://www.engadget.com/2010/09/19/apple-patent-app-hints-at-ipod-based-phones-peel-520-turns-shad/, Sep. 19, 2010, p. 1.
Kenja's Newsletter, About Newsletter, http://kenja.net/news.main.html, printed from the World Wide Web, "last modified Fri, Oct. 10, 2003".
Openwave, "Comparison of WAP Push and Short Message Service (SMS)," Openwave Systems, Inc., Redwood City, CA, Apr. 2002.

QUALCOMM, uiOne™, http://brew.qualcomm.com/brew/in/about/uione.html.
Scansoft press release, "Scansoft Launches SpeechPAK Healthcare Suite 2.0", http://dragontranscription.com/press-releases-articles-february-2005/scansoft-launches-speechpak-healthcare-suite-2.0.html, Feb. 17, 2005.
Stanford Technology Ventures Program, "Danger, Inc.: Powering the Next Generation of Mobile Technology", Oct. 15, 2003.
First Action Interview Pre-Interview Communication dated Apr. 24, 2012, U.S. Appl. No. 12/876,220, filed Sep. 6, 2010.
Office Action—Restriction Requirement dated Feb. 1, 2012, U.S. Appl. No. 12/876,221, filed Sep. 6, 2010.
Office Action dated May 10, 2012, U.S. Appl. No. 12/876,221, filed Sep. 6, 2010.
FAIPP Pre-Interview Communication dated Jul. 19, 2012, U.S. Appl. No. 13/018,083, filed Jan. 31, 2011.
Notice of Allowance dated Mar. 30, 2012, U.S. Appl. No. 13/029,103, filed Feb. 16, 2011.
Office Action dated Apr. 15, 2008, U.S. Appl. No. 11/046,083, filed Jan. 28, 2005.
Final Office Action dated Oct. 28, 2008, U.S. Appl. No. 11/046,083, filed Jan. 28, 2005.
Office Action dated Aug. 15, 2011, U.S. Appl. No. 12/330,759, filed Dec. 9, 2008.
Office Action dated Apr. 3, 2008, U.S. Appl. No. 11/333,964, filed Jan. 17, 2006.
Final Office Action dated Oct. 8, 2008, U.S. Appl. No. 11/333,964, filed Jan. 17, 2006.
Final Office Action dated Jan. 21, 2009, U.S. Appl. No. 11/333,964, filed Jan. 17, 2006.
Advisory Action dated Apr. 13, 2009, U.S. Appl. No. 11/333,964, filed Jan. 17, 2006.
Office Action dated Jun. 23, 2009, U.S. Appl. No. 11/333,964, filed Jan. 17, 2006.
Final Office Action dated May 11, 2010, U.S. Appl. No. 11/333,964, filed Jan. 17, 2006.
Advisory Action dated Jul. 22, 2010, U.S. Appl. No. 11/333,964, filed Jan. 17, 2006.
Wolter, Eric, Patent Application entitled "Method and System for Calendar-Based Delivery of Themed User-Interface Skins," filed Dec. 9, 2008, U.S. Appl. No. 12/330,759.
Wolter, Eric S., Patent Application entitled "Method and System for Delivery of User-Interface Skins, Applications, and Services to Wireless Devices," filed Jan. 17, 2006, U.S. Appl. No. 11/333,964.
Delker, Jason R., et al., Patent Application entitled "Provisioning System and Methods for Interfaceless Phone," filed Sep. 6, 2010, U.S. Appl. No. 12/876,220.
Delker, Jason R., et al., Patent Application entitled "System and Method for ID Platform," filed Feb. 8, 2011, U.S. Appl. No. 13/023,486.
Delker, Jason R., et al., Patent Application entitled "Dynamic Loading, Unloading, and Caching of Alternate Complete Interfaces," filed Sep. 6, 2010, U.S. Appl. No. 12/876,221.
Delker, Jason R., et al., Patent Application entitled "Shared ID with Second Party," filed Jan. 31, 2011, U.S. Appl. No. 13/018,083.
Delker, Jason R., et al., Patent Application entitiled "Extending ID to a Computer System," filed May 27, 2011, U.S. Appl. No. 13/118,058.
Davis, John M., et al., Patent Application entitled "Mirroring Device Interface Components for Content Sharing," filed Mar. 10, 2011, U.S. Appl. No. 13/045,292.
Cha, Tae-Woo, et al., Patent Application entitled "Device Experience Adaptation Based on Schedules and Events," filed Jun. 29, 2012, U.S. Appl. No. 13/537,563.
Smith, Nathan A., et al., Patent Application entitled "Restricted Testing Access for Electronic Device," filed Jun. 16, 2011, U.S. Appl. No. 13/161,496.
Katzer, Robin Dale, et al., Patent Application entitled "Zone Architecture for Dynamic Targeted Content Creation," filed Oct. 11, 2011, U.S. Appl. No. 13/271,207.
Delker, Jason R., et al., Patent Application entitled "Ad Sponsored Communication Pack," filed Feb. 18, 2011, U.S. Appl. No. 13/031,123.

(56) References Cited

OTHER PUBLICATIONS

FAIPP Office Action dated Jan. 2, 2014, U.S. Appl. No. 12/876,220, filed Sep. 6, 2010.
Office Action dated Dec. 26, 2013, U.S. Appl. No. 13/018,083, filed Jan. 31, 2011.
Advisory Action dated Nov. 22, 2013, U.S. Appl. No. 13/118,058, filed May 27, 2011.
Office Action dated Dec. 17, 2013, U.S. Appl. No. 13/031,123, filed Feb. 18, 2011.
Pre-Interview Communication dated Feb. 26, 2013, U.S. Appl. No. 13/023,486, filed Feb. 8, 2011.
Final Office Action dated Jan. 11, 2013, U.S. Appl. No. 12/876,221, filed Sep. 6, 2010.
Pre-Interview Communication dated Feb. 26, 2013, U.S. Appl. No. 13/118,058, filed May 27, 2011.
Office Action dated Mar. 14, 2013, U.S. Appl. No. 13/161,496, filed Jun. 16, 2011.
Delker, Jason R., et al., Patent Application entitled "Transition Experience During Loading and Updating an Interface and Applications Pack," filed Oct. 24, 2012, U.S. Appl. No. 13/659,889.
Final Office Action dated May 18, 2015, U.S. Appl. No. 13/659,889, filed Oct. 24, 2012.
Notice of Allowance dated Apr. 22, 2015, U.S. Appl. No. 13/031,123, filed Feb. 18, 2011.
Schwermann, Nathan M., et al., entitled "Methods for Customization of Default Applications on a Mobile Communication Device," filed Apr. 30, 2015, U.S. Appl. No. 14/701,156.
Foreign Communication From a Related Counterpart Application—International Preliminary Report on Patentability dated Feb. 12, 2015, PCT/US2013/052805 filed on Jul. 24, 2013.
Supplemental Notice of Allowanced dated Dec. 3, 2014, U.S. Appl. No. 13/118,058, filed May 27, 2011.
Notice of Allowance dated Jan. 6, 2015, U.S. Appl. No. 13/045,292, filed Mar. 10, 2011.
FAIPP Office Action dated Dec. 2, 2014, U.S. Appl. No. 13/271,207, filed Oct. 11, 2011.
Final Office Action dated Jun. 4, 2015, U.S. Appl. No. 13/271,207, filed Oct. 11, 2011.
Pre-Interview Communication dated Jun. 8, 2015, U.S. Appl. No. 14/476,339, filed Sep. 3, 2014.
Notice of Allowance dated Jul. 16, 2015, U.S. Appl. No. 14/476,339, filed Sep. 3, 2014.
Advisory Action dated Jul. 27, 2015, U.S. Appl. No. 13/659,889, filed Oct. 24, 2012.
FAIPP Pre-Interview Communication dated Jul. 24, 2015, U.S. Appl. No. 14/168,007, filed Jan. 30, 2014.
Fultz, David K., et al., "Virtual Preloads," filed Jan. 30, 2014, U.S. Appl. No. 14/168,007.
Advisory Action dated Oct. 29, 2015, U.S. Appl. No. 13/271,207, filed Oct. 11, 2011.
Office Action dated Oct. 1, 2015, U.S. Appl. No. 14/701,156, filed Apr. 30, 2015.
Pre-Interview Communication dated Dec. 1, 2015, U.S. Appl. No. 14/042,707, filed Sep. 30, 2013.
Notice of Allowance dated Feb. 8, 2016, U.S. Appl. No. 14/042,707, filed Sep. 30, 2013.
Office Action dated Dec. 1, 2015, U.S. Appl. No. 13/659,889, filed Oct. 24, 2012.
Final Office Action dated Jan. 28, 2016, U.S. Appl. No. 14/168,007, filed Jan. 30, 2014.
Final Office Action dated Feb. 8, 2016, U.S. Appl. No. 14/701,156, filed Apr. 30, 2015.
Office Action dated Mar. 14, 2016, U.S. Appl. No. 13/271,207, filed on Oct. 11, 2011.
Notice of Allowance dated May 4, 2016. U.S. Appl. No. 13/659,889, filed Oct. 24, 2012.
Advisory Action dated Mar. 29, 2016, U.S. Appl. No. 14/168,007, filed Jan. 30, 2014.
Office Action dated Apr. 14, 2016, U.S. Appl. No. 14/168,007, filed Jan. 30, 2014.
Advisory Action dated Apr. 15, 2016, U.S. Appl. No. 14/701,156, filed Apr. 30, 2015.

\* cited by examiner

TRAFFIC MANAGEMENT OF THIRD PARTY APPLICATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Various mobile devices, such as mobile telephones and smartphones, are used today for mobile voice and/or data communications based on wireless network connectivity, which can be provided by base stations known as cell towers or sites. The mobile devices may be equipped with different wireless communications technologies, such as code division multiple access (CDMA), global system for mobile communications (GSM), long term evolution (LTE), worldwide interoperability for microwave access (WiMAX), other wireless technologies, or combinations thereof. The number of mobile devices and users has been continuously increasing and similarly the number of online (or Internet) based applications and services that are provided to users on the mobile devices. This increase in data demand and access puts more pressure on wireless networks and providers, such as cellular networks carriers. Since wireless access bandwidth is limited by infrastructure and shared by increasingly more users that access more applications and services, carriers are looking into solutions to reduce infrastructure cost without reducing access, experience, and quality of service to their customers. Some approaches to reduce pressure on wireless networks involve limiting data access on wireless networks and/or routing data traffic from the wireless networks onto local wireless networks that typically have a more restricted access range, such as a Wireless Fidelity (WiFi) network. However, such solutions may not be satisfactory to users since they limit access, service quality, and experience.

SUMMARY

In an embodiment, a proxy server for routing traffic between a mobile device and a network is disclosed. The proxy server comprises at least one processor, a memory, and a traffic monitoring application stored in the memory that, when executed by the at least one processor, monitors a plurality of mobile device installed applications that run on the mobile device and the mobile device installed applications' traffic. The traffic monitoring application also analyzes traffic usage for the mobile device installed applications. Additionally, the traffic monitoring application identifies the mobile device installed applications responsible for traffic that is excessive or unnecessary as determined by the mobile device's service provider. Further, the traffic monitoring application blocks, delays, or reports the excessive and unnecessary traffic without interrupting the mobile device's user communications.

In an embodiment, a method for managing traffic of a mobile device communicating with a network is disclosed. The method comprises monitoring a plurality of mobile device installed applications that run on the mobile device and traffic associated with the mobile device installed applications. The method also comprises analyzing traffic usage for the mobile device installed applications. The mobile device installed applications responsible for traffic that is excessive and unnecessary according to the mobile device's service carrier are also identified. Further, the method comprises promoting the reduction of excessive or unnecessary traffic for the identified mobile device installed applications that are not used by the user, that run without the user knowing, or both.

In an embodiment, a traffic management server for promoting traffic management between a mobile device and a network is disclosed. The traffic management server comprises at least one processor, a memory, and a traffic monitoring application stored in the memory that, when executed by the at least one processor, receives a plurality of reports from a plurality of mobile phones about a plurality of installed applications that run on the mobile phones and related traffic. Additionally, the traffic monitoring application aggregates the information in the reports from the mobile phones. The traffic monitoring application also analyzes overall traffic usage for the installed applications based on the reports. Further, the traffic monitoring application determines whether one or more of the installed applications and related traffic should be considered for more analysis and traffic management. The mobile phones with the determined installed applications are then sent an option to join a traffic management service to optimize the traffic and network usage by controlling or limiting the traffic.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
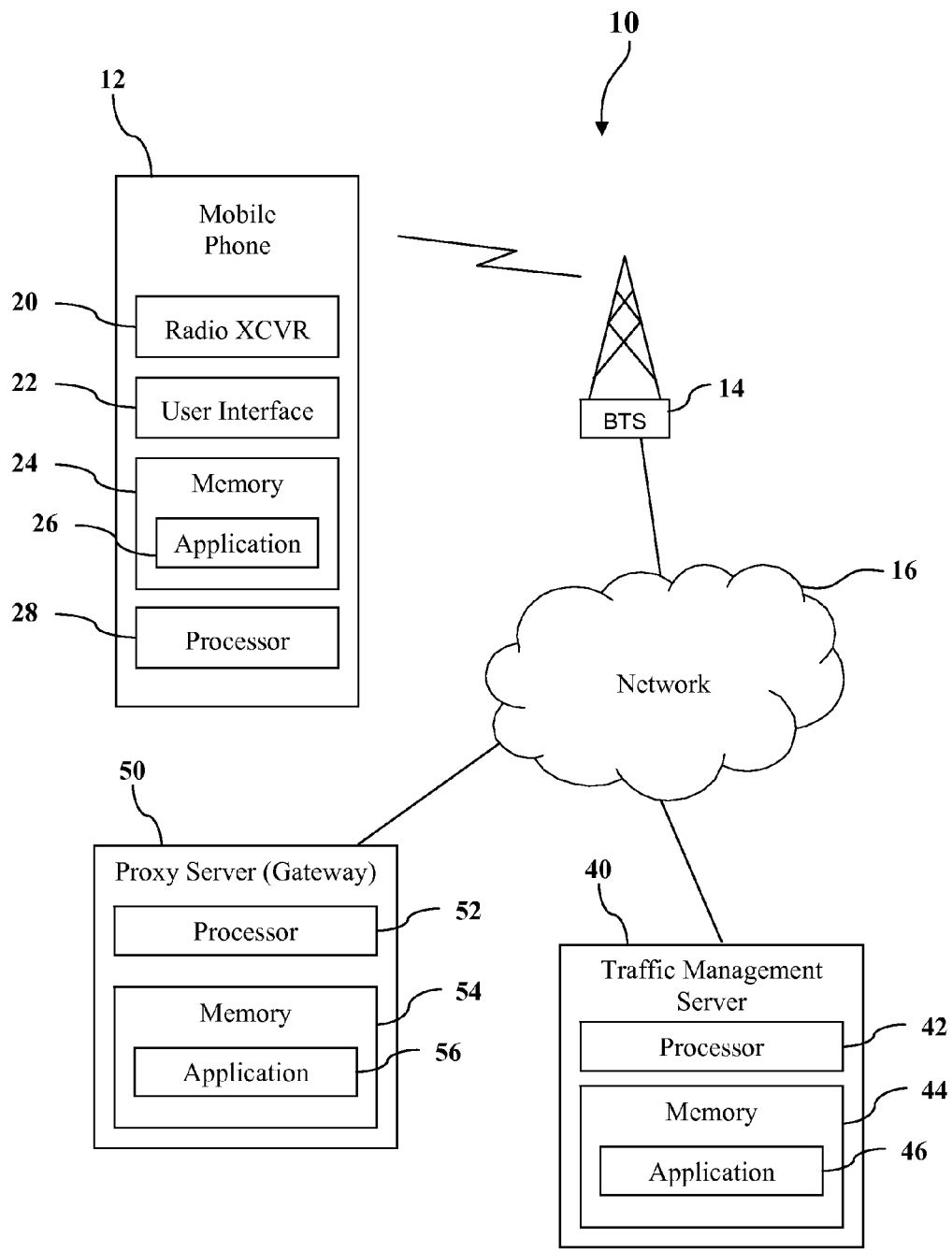
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As more mobile phones and similar mobile communication devices are deployed on cellular networks (and other wireless networks), voice and data traffic on the networks continues to increase. Efforts to limit traffic within a manageable capacity of the networks may include offloading at least some of the traffic to alternative access technologies. For example, to offload traffic from a cellar network, traffic transfer on a mobile phone may be switched automatically from the cellular network to a local WiFi network when the mobile phone is within range of the WiFi network. Such approach may not be desired by customers of wireless carriers since they may view this as limiting data usage on the network. Some users may also have security concerns when directed (without their choosing) from a cellular network to a less secure WiFi network. A user may also have a bad experience when switching from a cellular network to a WiFi network, such as experiencing long delays or even connection breaks.

Disclosed herein is a system and method for improved traffic management on wireless or cellular networks. The traffic may be managed to reduce some load on the wireless network without significantly affecting user access and experience. The method comprises identifying some traffic that may have lower priority or may be unnecessarily or excessively transmitted on the network and identifying the applications installed on the mobile device that are responsible for that traffic. The identified traffic may belong to mobile device installed applications that run on a mobile device and may be poorly developed or configured to generate excessive or unnecessary traffic. The mobile device installed applications may include third party applications that are provided by developers other than the mobile device's manufacturer and the wireless network service provider. The third party applications may include applications that run processes in the background of the mobile device without the user knowing, such as applications that generate periodic signals to update the applications' servers of the mobile device's location and/ or other information about the mobile device that are of interest to the applications' servers. The third party applications may also include applications that create logs for the applications' servers about the mobile device, advertisement updates on the mobile device, bi-directional communication applications, and/or other third party applications. The identified traffic may be blocked with or without user confirmation, delayed depending on current network conditions, or better managed by working with application developers to reduce some application traffic. This may alleviate some pressure or saturation on cell sites without significantly restricting user access or affecting user experience.

The system may comprise a traffic monitoring application that runs on a mobile device and that is configured for monitoring applications installed on the mobile device, which may also be running on the mobile device, and related traffic, and sending a report to a traffic management server. The monitored applications may include third party applications that may be developed by developers other than the mobile device's manufacturer and the wireless network service provider. The traffic management server may identify, based on the report, traffic that may need management on the mobile device and send the mobile device an option to register for closer traffic evaluation and management. During the traffic evaluation and management process, the system may manage any determined excessive or unnecessary traffic on the mobile device by implementing one or more schemes, including blocking the traffic (for example at selected times), delaying the traffic, and communicating with the developers of the mobile device installed applications that are responsible for the traffic to better manage that traffic.

As used herein, excessive and/or unnecessary traffic may comprise traffic generated by monitored applications that is inefficiently designed and/or programmed. Excessive and/or unnecessary traffic may comprise traffic that subordinates the functionality and/or performance of the service provider network to the interests and objectives of the monitored application developers. Excessive and/or unnecessary traffic may comprise traffic generated by monitored applications that are unknown and/or hidden from the user of the mobile device. Excessive and/or unnecessary traffic may comprise traffic that exceeds predefined limits on such traffic defined by the service provider and/or by the manufacturer of the mobile device.

In an embodiment, the network operator may define a plurality of application classes and define a maximum traffic for each application class. The traffic limits for each application class may set forth a plurality of different limitations, for example a maximum data rate, a maximum data volume over a time period, a maximum transmission frequency, and other limits. Third party application developers may be responsible for identifying their subject applications as belonging to one of the defined application classes and of assuring that their applications adhere to the predefined traffic limits. The traffic monitoring application may disable or delete monitored applications whose traffic exceeds the application class associated with the subject application. In an embodiment, the wireless service provider and/or the mobile device may limit the number of applications of each traffic class that may be installed on the mobile device, whereby to manage the traffic loads on the wireless network.

As such, the traffic may be managed on the mobile device or on a proxy server, for example a gateway that routes the identified traffic from the mobile device. Some traffic may be completely or partially blocked from transmission from the mobile device or from the proxy server. For example, the frequency of periodic signals from some third party applications, also referred to sometimes as heartbeats, may be reduced by blocking some of the heartbeats. The traffic may be queued and delayed at the mobile device or the proxy server, such as during peak traffic time on the network. The carrier or wireless network service provider may also contact the developers of the identified traffic applications to request or demand that they alter their applications, for example to reduce excessive traffic transmissions or remove unnecessary traffic transmissions from the applications on the mobile device.

In another implementation, the traffic monitoring application on the mobile device may identify and determine which traffic (e.g., third party traffic) needs management and may register with the system to manage that traffic. The traffic may then be managed by implementing one or more of the schemes above on the mobile device or a proxy server (gateway). The traffic management schemes above may reduce network congestion or saturation due to application traffic on the mobile device. Reducing the traffic transmissions (and receptions) on the mobile device may also reduce battery consumption and improve privacy without affecting user experience.

FIG. 1 illustrates an embodiment of a communication system 10 that may implement the traffic management scheme for a mobile device. The communication system 10 may comprise a mobile device or phone 12, a base transceiver station (BTS) 14, a network 16, a traffic management server 40, and a proxy server 50. The mobile device or phone 12 may be a mobile phone, a personal digital assistant (PDA), a media player, or other wireless communication enabled electronic device. In an embodiment, the mobile phone 12 may be implemented as a handset. Details of handsets are discussed further hereinafter. The base transceiver station 14 provides a wireless communication link to the mobile phone 12 and couples the mobile phone 12 to the network 16. In an embodiment, the base transceiver station 14 provides a wireless communication link to the mobile phone 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 14 is illustrated in FIG. 1, it is understood that the communication system 10 may comprise any number of base transceiver stations 14 and any number of mobile phones 12. The network 16 may be a public communication network, a private communication network, or a combination thereof.

The mobile phone 12 may comprise a radio transceiver 20, a first user interface 22, a first memory 24, and a first processor 28. Alternatively, the mobile phone 12 may comprise two or more radio transceivers 20. The mobile phone 12 may also comprise a traffic monitoring application 26 stored in the first memory 24 and configured to run on the first processor 28. The traffic management server 40 may comprise a second processor 42, a second memory 44, and a traffic analysis application 46 stored in the second memory 44 and configured to run on the second processor 42. The proxy server 50 may comprise a third processor 52, a third memory 54, and a proxy server application 56 stored in the third memory 54 and configured to run on the third processor 52.

The traffic monitoring application 26 may be configured to monitor a plurality of applications that are installed and run on the mobile phone 12 and corresponding traffic. The mobile device installed applications may comprise pre-loaded applications, embedded applications, downloaded applications, or combinations thereof. At least some of the monitored applications may be third party applications developed by third parties other than the manufacturer or the service provider (carrier) of the mobile phone 12. The monitored traffic may be incoming traffic, outgoing traffic, or both. Monitoring the application 26 may comprise collecting operation data and statistics about the applications running on the mobile phone and about the traffic generated for the applications. For example, the traffic monitoring application 26 may evaluate how many applications are running during a monitored time period and how much data usage or traffic exchange occurs during the monitored time period. The data usage or traffic exchange may be measured in amount of data or bandwidth (e.g., in kilobytes or bits), data rate (e.g., in kilobytes per seconds or bits per seconds), other data volume units, or combinations thereof. The monitored time period may correspond to high or peak network usage times, for example during day work hours, early evening hours, or other determined periods of high network usage. Monitoring the mobile device installed applications and associated traffic at such peak network usage times may be significant since the applications' traffic is more likely to cause network saturation at such times than other less active network times (e.g., late night or early morning times).

Further, to ensure no or minimal service interruption and compromise to user experience, the traffic monitoring application 26 may start monitoring applications and traffic on the mobile phone 12 if low activity operation conditions of the mobile phone 12 are satisfied. For instance, the traffic monitoring application 26 may start the monitoring process (during the determined time periods) only if the phone display screen is turned off, the phone's accelerometer (if available) shows no movement, battery usage is relatively low, WiFi connectivity is tuned off or inactive, other indicators that show no or minimal user phone activities are detected, or combinations thereof. Running the traffic monitoring applications 26 during such low activity operation conditions may also reveal any mobile device installed applications that generate excessive or unnecessary high traffic, since the mobile phone 12 would be in a relative low operation state, for example unused by a user.

The traffic monitoring application 26 may generate a monitoring report after collecting applications and traffic monitoring data (e.g., number of running applications and amount of outgoing/incoming traffic per application), and send the report to the traffic analysis application 46 on the traffic management server 40. The report may be generated and sent after each monitored time period. Alternatively, the report may be generated and updated after a determined number of monitored time periods, and may be sent subsequently. In yet another implementation, the report may be generated and updated for one or more monitored time periods and may then be sent upon request from the traffic management server 40 or upon the traffic monitoring application 26 detecting relatively highly traffic.

In an embodiment the traffic monitoring application 26 may be part of an interface and applications pack (IAP). The interface and applications pack may comprise at least one of a media file, an application program, a web widget, and a network service and may be used to customize the communication experience of using an electronic device (the mobile phone 12). An interface and applications pack may be viewed as an aggregated set of application programs, web widgets, network services, ring tones, ringback tones, alerting tones, wallpapers, interface controls, and other content targeted for the electronic device. In some contexts, the interface and applications pack may be referred to as an identity (ID) pack or an ID zone. For instance, the interface and applications pack may provide controls to access a network application that promotes participation in relevant social media, for example to participate in a home improvement discussion forum sponsored by the subject retail store, to post photographs of home improvement projects the user has completed, and to post descriptions of the materials used and/or innovations applied to overcome peculiar problems.

The interface and applications pack may provide interface controls for selecting functionality provided as part of the interface and applications pack as well as for selecting functionality that may be provided by the electronic device independently of the interface and applications pack. For example, the interface and applications pack may provide a control for invoking an address book widget that is provided by the firmware of the electronic device or for invoking a voice call dialing functionality. Interface controls provided by the interface and applications pack that invoke functions provided by the electronic device itself, for example provided in firmware of the electronic device, may be referred to as encapsulated controls. The encapsulated controls may include the traffic monitoring application 26. Such encapsulation of controls by the interface and applications pack may promote a more complete adaptation of the communication experience.

The interface and applications pack is experienced, at one level of abstraction, as a unity. For example, when a user selects an ID pack for installation on the electronic device, the user may perform a single selection action, and the self-installation routine may perform a number of separate and distinct actions to stand-up the selected ID pack that are not observed by the user. When the user selects an ID pack to be active, a currently active ID pack may be deactivated and the various distinct components of the selected ID pack may be brought into operation as a single global action, mediated by the automatic self-installation routine. The unity of experience may be further promoted by interactions among the several components of the ID pack. For example, selection of controls in a web widget of the ID pack may invoke playback of audios stored in media files of the ID pack; for example, execution of an application program of the ID pack may trigger a modification of the wallpaper presented as a backdrop for the display of the electronic device.

An interface and applications pack may be tested to assure that the aggregation of media files, application programs, web widgets, and network services interact appropriately with each other and do not impair other functionality of the electronic device. The testing may verify that the interface and applications pack interoperates with a range of different electronic devices, standard firmware, and/or standard application software. In an embodiment, the service provider may impose a constraint that interface and applications packs be provided to the electronic device from a controlled content source so that the service provider can exercise oversight and quality control of interface and applications packs. For further details about interface and applications packs, see U.S. patent application Ser. No. 12/876,220, filed Sep. 6, 2010, entitled "Provisioning System and Methods for Interfaceless Phone," by Jason R. Delker, et al.; U.S. patent application Ser. No. 13/023,486, filed Feb. 8, 2011, entitled "System and Method for ID Platform," by Jason R. Delker, et al.; U.S. patent application Ser. No. 12/876,221, filed Sep. 6, 2010, entitled "Dynamic Loading, Unloading, and Caching of Alternate Complete Interfaces," by Jason R. Delker, et al.; and U.S. patent application Ser. No. 13/118,058 filed May 27, 2011, entitled "Extending ID to a Computer System," by Jason R. Delker, et al., all of which are incorporated herein by reference in their entirety.

The traffic analysis application 46 may be configured to receive a plurality of reports from a plurality of mobile phones 12 and analyze overall traffic usage for different applications installed on the mobile device or phone 12 based on the reports. The traffic analysis application 46 may aggregate the information in the reports from a plurality of mobile phones 12, combine and process the information to obtain aggregated application usage of the network 16, and detect any mobile device installed applications (e.g., third party applications) that have relatively higher traffic that is excessive, unnecessary, and/or generated without users knowing (e.g., in background processes on the mobile phones 12). The information in the reports may also be aggregated over a plurality of monitored time periods to obtain average traffic usage patterns for the applications on the mobile device or phone 12. The traffic analysis application 46 may combine this received information from the mobile phones 12 with other traffic and network usage information from the network 16, such as the load on a cell tower or site, and apply algorithms and logic to analyze the mobile device installed applications and related traffic usage on the mobile phones 12 and their impact on the network 16. Based on the analysis, the traffic analysis application 46 may determine whether one or more applications and related traffic on one or more mobile phones 12 should be considered for closer or further in depth analysis. For example, the mobile phones 12 may be considered for further analysis when one or more applications on the mobile phones 12 generate relatively high traffic, which may lead to network saturation or may be non-critical traffic that needs further control or optimization. The relatively high traffic may be determined in relation to normal traffic flow (in the network 16) for one or a plurality of mobile phones 12, for example at a cell tower or site. The normal traffic flow may be evaluated or represented by calculating or estimating the mean traffic volume (e.g., in terms of data bandwidth and/or rate) of one mobile phone 12, a plurality of mobile phone 12, or both. The mean and standard deviation may be evaluated for all types of traffic, for traffic that belong to third party applications, per application basis, depending on different usage times during the day, or combinations thereof. The relatively high traffic may then be identified as traffic that exceeds, for example, one or two standard deviations on an application basis, a time of day basis, and/or other criteria.

In order to further evaluate such relatively high traffic and associated applications, the traffic analysis application 46 may send the monitoring application 26 an option or invitation to join an additional traffic monitoring service that may be provided by the system 10 to optimize the traffic and network usage by controlling or limiting the traffic for one or more identified applications on the mobile device or phone 12. For instance, the traffic monitoring service may be provided by proxy server application 56 of the proxy server 50, as described below. The traffic analysis application 46 may send the notification to join the traffic management service only to the mobile phones 12 that comprise installed applications that generate relatively high traffic. The traffic management service may be provided by the service provider of the mobile phones 12.

If the user of the mobile device 12 elects to register the mobile phone 12 with the traffic management service, an acknowledgement may be sent to the traffic management server 40. Hence, the incoming and outgoing traffic for the applications on the mobile phone 12 may be routed via the proxy server 50, which may serve as a gateway. For instance, an Internet Protocol (IP) address may be appended to Hypertext Transfer Protocol (HTTP) proxy settings of the mobile phone 12 to register the mobile phone 12 with the proxy server 50. The IP proxy address may redirect all IP traffic through the proxy server 50 (or gateway), where the proxy server application 56 may be configured to monitor the traffic and identify the applications responsible for the traffic on the mobile phone 12. The traffic may be associated with the corresponding applications using IP addresses corresponding to the applications in the transported traffic. The proxy server application 56 may maintain logs for the applications and corresponding traffic, which may be analyzed to determine what applications cause relatively higher traffic and require optimization or traffic control. This analysis may be similar to the analysis of the traffic analysis application 46 but may involve only the mobile phones 12 that register with the proxy server 50. Further, since the analysis of the proxy server application 56 involves all routed traffic of the mobile phone 12, the analysis may allow further insight with more details about the applications and traffic of the mobile phone 12. The applications with relatively higher traffic may be third party applications that have excessive traffic, such as applications that run processes in the background of the mobile phone 12 to send heartbeats to the applications' servers or applications that are poorly developed and generate or require unnecessary high traffic, for example in comparison to similar applications. Such applications may be restricted or blocked without compromising the user experience. The analysis may also determine that some applications that have relatively high traffic, such as video streaming applications are used by the user of the mobile phone 12 and should not be restricted or blocked to avoid compromising or affecting the user experience.

After determining which of the applications should be optimized and which application traffic should be restricted or blocked, the proxy server application 56 or the proxy server 50 may implement one or more schemes to manage the applications' traffic or optimize the applications' behavior. In one scheme, the applications may be reported to the service provider, which may then contact the applications' developer to work on improving their applications. The service provider may provide the developers incentives to cooperate on improving their applications to reduce the amount of application traffic, such as reducing signaling for location updates of the mobile phone 12 or other signaling that is used to update the applications' servers about the state of the mobile phone 12. For example, the traffic may be reduced by reducing or removing the heartbeats of the background processes of the applications or other traffic that the user may not be aware of or give consent to. The incentives may include adding the optimized applications to embedded or downloaded application packages for the mobile phone 12, adding the optimized applications to a list of trusted and certified applications by the service provider, sending advertisement or information about the optimized applications, and/or other marketing incentives. The service provider may also discourage the developers from providing poorly developed applications that generate unnecessary or excessive traffic by threatening to block or ban such applications on the mobile phone 12.

In another scheme, the proxy server 50 may serve as a firewall for blocking at least some of the relatively high application traffic. A pre-determined list of allowed applications may be maintained at the proxy server 50, also referred to herein as a white list. For instance, the white list may comprise trusted and/or tested applications by the service provider, e.g., applications that are optimized for traffic management and control. Thus, only traffic for the applications on the white list may be allowed for the mobile phone 12 and other application traffic may be blocked. In another implementation, the traffic of applications excluded from the white list may be blocked if the traffic is deemed (by the proxy server application 56) to be relatively high. Additionally or alternatively, a list of banned or uncertified applications, also referred to herein as a black list, may be maintained and used to determine which applications to block traffic for. Thus, all traffic for the applications on the black list may be blocked by the proxy server 50 or only traffic deemed to be relatively high for applications on the black list may be blocked. In some scenarios, the traffic is deemed relatively high if the amount of traffic exceeds a pre-determined threshold per application.

In yet another scheme, the proxy server 50 may delay or partially block some application traffic that is deemed relatively high by queuing or partially dropping some of the traffic data (or packets). For example, in the case of an application background process that sends excessive heartbeats to the application server, such as a heartbeat every few seconds, the heartbeats may be queued and then release at once or some of the heartbeats may be dropped to achieve a slower frequency, such as a heartbeat every few minutes. One or more of the schemes above may be implemented by the proxy server 50 to manage the traffic for the applications that run on the mobile phone 12, which may be third party applications, to reduce traffic or data usage in the network. However, since the traffic flow is managed at the proxy server 50 and not at the mobile phone 12, some of the incoming or outgoing excessive traffic may still exist in the network 16 (on the mobile phone 12 side or the network side). In some embodiments, the traffic management server 40 and the proxy server 50 (gateway) may be the same server. For example, the same server in the network 16 may implement the traffic analysis application 46 and the proxy server application 56.

Figure 2:
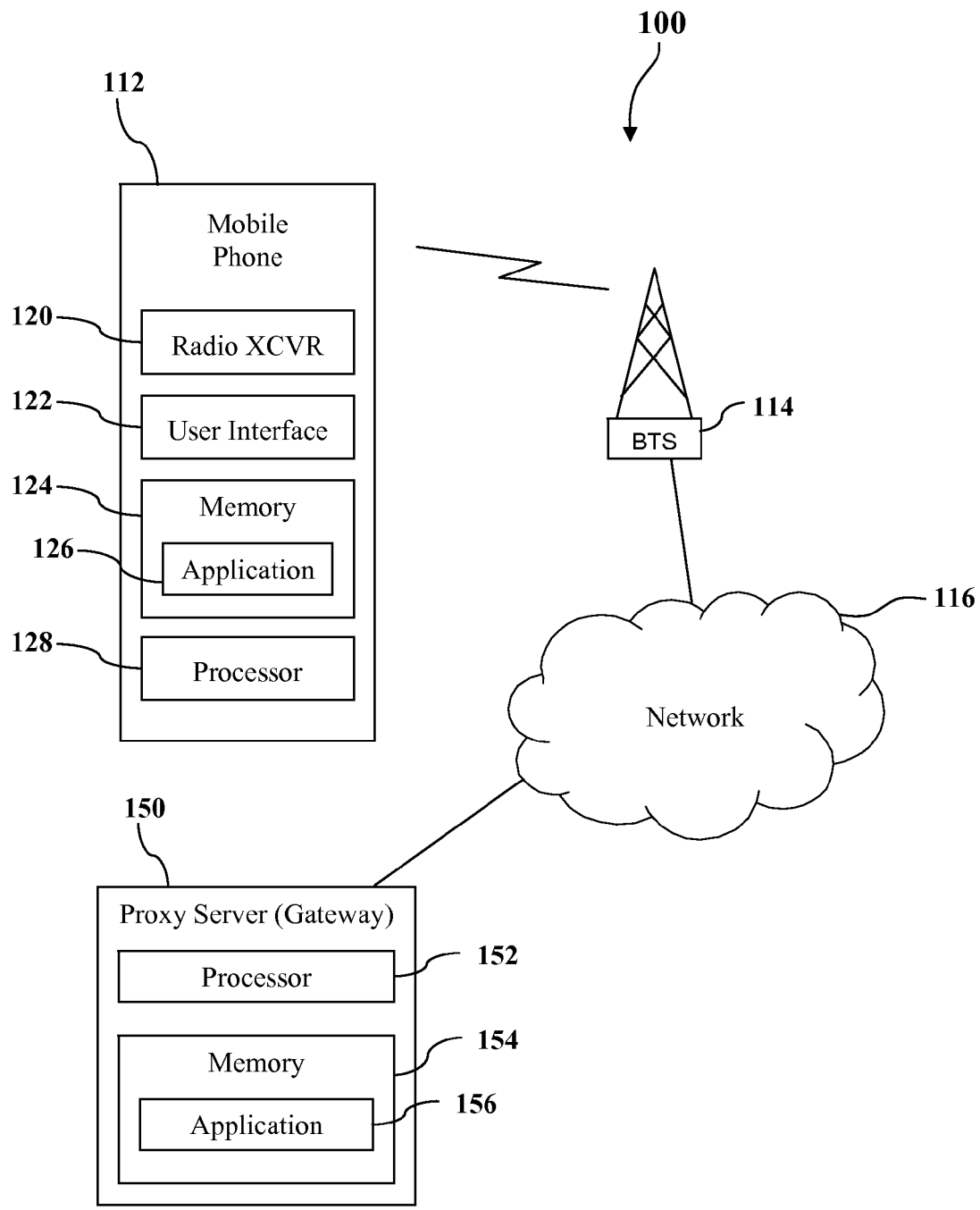
FIG. 2 is a block diagram of a communication system according to an embodiment of the disclosure.

FIG. 2 illustrates an embodiment of a communication system 100 that may also implement the traffic management scheme for a mobile device. The communication system 100 may comprise a mobile device or phone 112, a base transceiver station 114, a network 116, and a proxy server 150. The mobile device or phone 112 may be similar to the mobile phone 12, the base transceiver station 114 may be similar to the base transceiver station 14, the network 116 may be similar to the network 16, and the proxy server 150 may be a gateway similar to the proxy server 50.

The mobile phone 112 may comprise a radio transceiver 120, a user interface 122, a first memory 124, and a first processor 128. Alternatively, the mobile phone 112 may comprise two or more radio transceivers 120. The mobile phone 112 may also comprise a traffic monitoring and analysis application 126 stored in the first memory 124 and configured to run on the first processor 128. The proxy server 150 may comprise a second processor 152, a second memory 154, and a proxy server application 156 stored in the second memory 154 and configured to run on the second processor 152.

The monitoring and analysis application 126 may be configured to monitor a plurality of applications that run on the mobile phone 112 and corresponding traffic, similar to the monitoring application 26, and to analyze traffic usage for the applications. The analysis may comprise detecting any applications (e.g., third party applications) that have relatively higher traffic volume that is excessive, unnecessary, and/or generated without users knowing (e.g., in background processes on the mobile phones 112). The analysis may include aggregating traffic for different applications and different monitored time periods to obtain average traffic usage patterns for the applications on the mobile phone 112. The monitoring and analysis application 126 may apply algorithms and logic to analyze the applications and related traffic usage on the mobile phones 112, similar to the traffic analysis application 46. However, unlike the traffic analysis application 46, the monitoring and analysis application 126 may not aggregate the applications and traffic information from a plurality of mobile phones, which may limit or reduce the scope of the analysis. This may be compensated for by receiving aggregated information from the network 116. Since the monitoring and analysis application 126 does not send report information to the network 116, the system 100 may use less communications to maintain the traffic at the expense of more processing on the mobile phone 112 (more operations by the monitoring and analysis application 126).

When the monitoring and analysis application 126 detects relatively high traffic for applications on the mobile phone 112, the monitoring and analysis application 126 or the mobile phone 112 may signal the proxy server 150 to register with a traffic management service, for example after a confirmation from the user of the mobile phone 112. Hence, the incoming and outgoing traffic for the applications of the mobile phone 112 may be routed via the proxy server 150, which may serve as a gateway. For instance, an Internet Protocol address may be appended to Hypertext Transfer Protocol proxy settings of the mobile phone 112. The IP proxy address may redirect all IP traffic through the proxy server 150 (or gateway), which may be configured similar to the proxy server 50. Similar to the server application 56, the proxy server application 156 may monitor the traffic for the applications on the mobile phone 112, identify the applications responsible for relatively high traffic on the mobile phone 112, maintain logs for the applications and corresponding traffic, restrict or block some of the relatively high traffic without compromising the user experience. After determining which of the applications should be optimized and which application traffic should be restricted or blocked, the proxy server application 156 or the proxy server 150 may implement one or more of the schemes above to manage the applications' traffic or optimize the applications' behavior.

In yet a third embodiment of a communication system that implements the traffic management scheme for a mobile device, the mobile device or phone may comprise a traffic monitoring, analysis, and control application that implements on the mobile phone the functions of all the applications used in the system 10 or 100. Accordingly, the traffic monitoring, analysis, and control application may monitor a plurality of applications that run on the mobile phone and corresponding traffic, analyze traffic usage for the applications, identify the applications responsible for relatively high traffic on the mobile phone, maintain logs for the applications and corresponding traffic, and restrict or block some of the relatively high traffic without compromising the user experience. The monitoring, analysis, and control application may implement on the mobile phone one or more of the schemes above to manage the applications' traffic or optimize the applications' behavior. In comparison to the systems 10 and 100, this system may use less communications to maintain the traffic at the expense of more processing on the mobile phone (more operations by the traffic monitoring, analysis, and control application).

Figure 3:
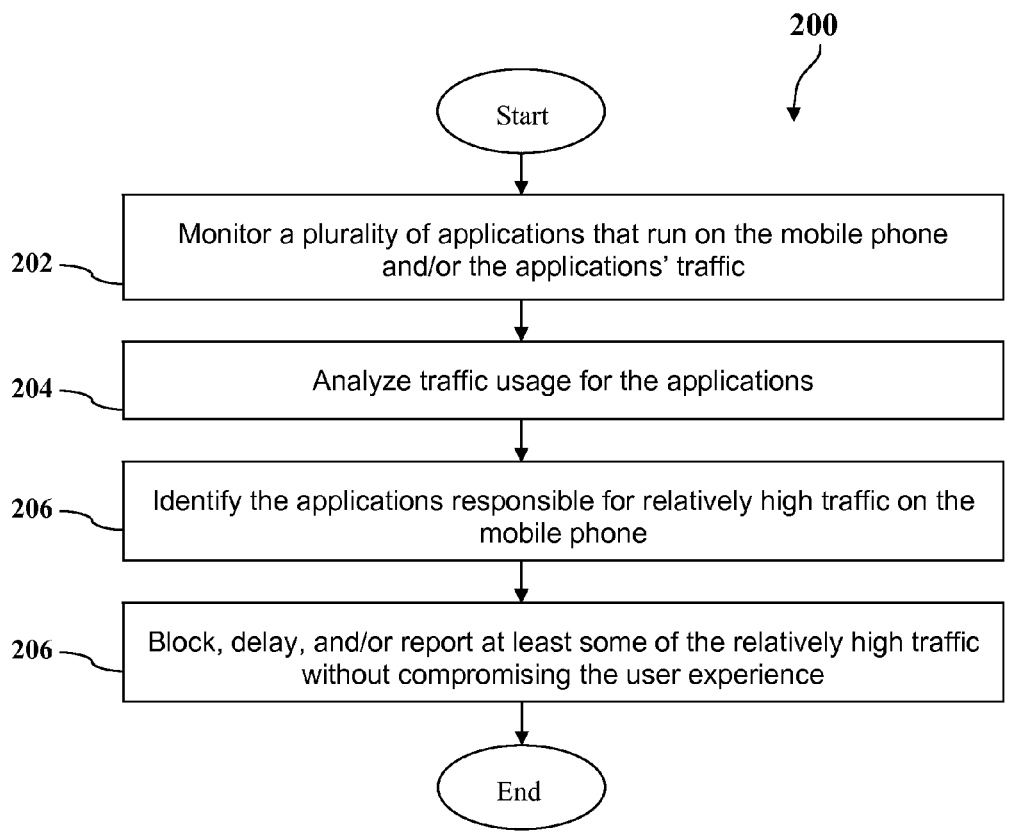
FIG. 3 is a flow chart of a method for managing application traffic for a mobile device according to an embodiment of the disclosure.

FIG. 3 illustrates an embodiment of a method 200 for managing application traffic for a mobile device. For instance, the method 200 may be implemented by the proxy server 50 in the system 10 or by a mobile phone in another embodiment. At block 202, a plurality of applications that run on the mobile phone and/or the applications' traffic may be monitored. The applications and related traffic may be monitored on the mobile phone by an application (e.g., as part of an interface and applications pack) on the mobile phone, which may be activated by the user. The monitored applications may be third party applications running on the mobile phone, with or without the user knowing (e.g., operated by the user or running in the background). The applications/traffic may be monitored during determined time periods that correspond to peak traffic time. In the case of using a proxy server or gateway, the traffic routed at the proxy server may be used to monitor the applications' traffic. The gateway may associate the traffic with the corresponding applications based on the IP addresses of the traffic.

At block 204, traffic usage of the application may be analyzed. The traffic may be monitored and logged for multiple consecutive time periods to determine an average pattern of usage. The traffic may be analyzed using algorithms and logic to determine the relatively high traffic that affects network usage and that may be reduced by better optimizing the responsible applications. At block 206, the applications responsible for relatively high traffic on the mobile phone may be identified. This may include applications that run background processes ineffectively or that generate relatively high frequency of heartbeats, such as applications that create logs for the applications' servers about the mobile device, applications for advertisement updates on the mobile device, bi-directional communication applications, and/or other third party applications. At block 206, at least some of the relatively high traffic may be blocked, delayed, and/or reported to the service provider without compromising the user experience. For example, such mechanisms are described in the three traffic control schemes above by the proxy server 50. For example, the proxy server 50 or the mobile device in another embodiment may only allow traffic for applications that are approved, block traffic for applications that are black listed, reduce frequency of signaling for some applications via queuing, and/or provide feedback to the server provider to work with the applications' developers on reducing such traffic. As such the traffic may be managed to reduce network load without forcing the user of the mobile device to switch from a selected first connection (e.g., a cellular or LTE link) into a second connection (e.g., a WiFi link), which may have more limited and/or less secure coverage.

For example, the service provider may provide suggestions for the developers to use heartbeats less frequently overall or to reduce the frequency of heartbeats transmitted from the mobile device 12 during peak network loading. The service provider may suggest that the developers reduce the load of their applications on the network during intervals when the subject application is sleeping and not actively being used by the user of the mobile device 12. The service provider may suggest the developers redesign their applications to collect and store metrics and upload these metrics from the mobile device 12 once a week in off-peak hours, based on a randomizing scheduling algorithm that reduces the simultaneous uploading of metrics that may undesirably overload the network. Alternatively, the service provider may define traffic limits and impose these limitations on the application developers as a condition for allowing the application be distributed through an application repository managed by the service provider.

Figure 4:
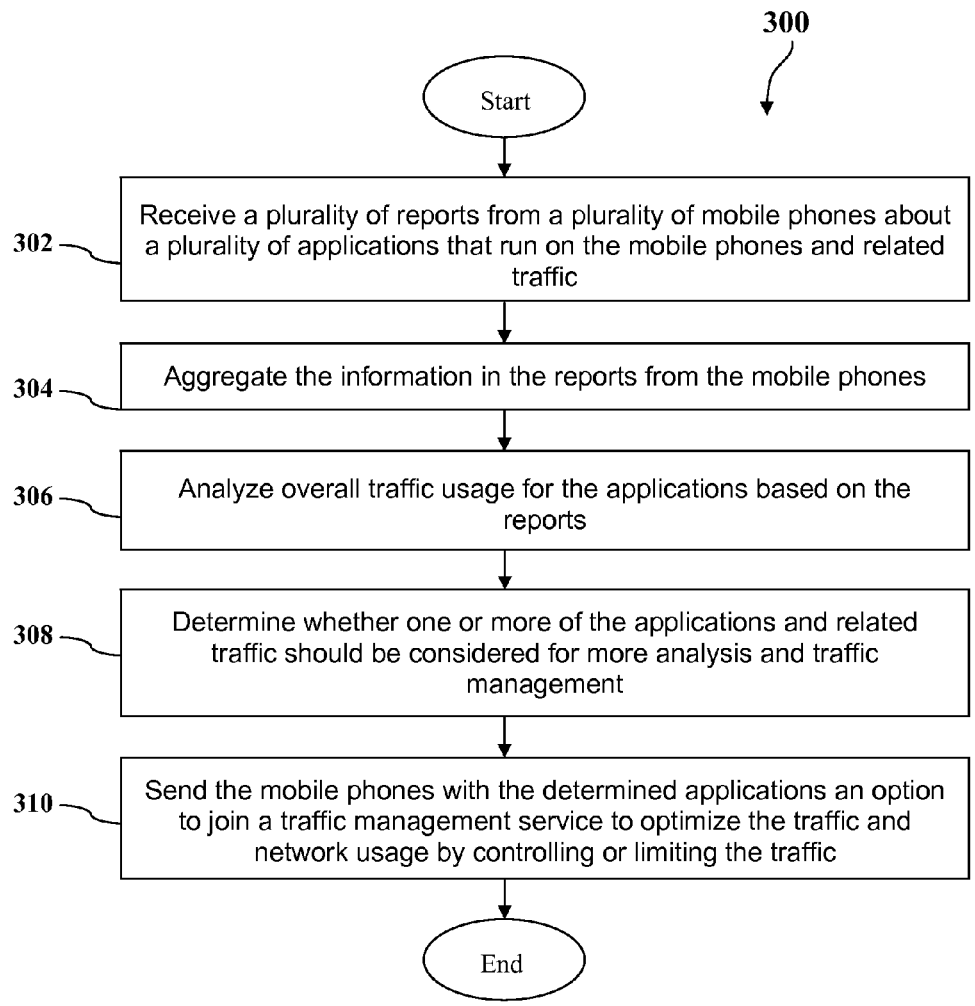
FIG. 4 is a flow chart of a method for managing application traffic for a mobile device according to an embodiment of the disclosure.

FIG. 4 illustrates an embodiment of a method 300 for managing application traffic for a mobile device. For instance, the method 300 may be implemented by the traffic management server 40 that communicates with a mobile phone 12 and, in some embodiments, with a separate proxy server 50. The management server 40 may also implement the method 200 if the traffic management server 40 also serves as a gateway for routing traffic for the mobile phone 12, as described above. At block 302, a plurality of reports may be received from a plurality of mobile phones about a plurality of applications that run on the mobile phones and related traffic. For example, the reports may be received at the end of the monitored time periods of the mobile phones, during peak traffic time of the network, and/or any schedule time by the traffic management server 40 or the mobile phones 12.

At block 304, the information in the reports from the mobile phones may be aggregated. The traffic management server 40 may aggregate the information to obtain average traffic usage patterns for the applications, and to compare traffic usage for the same application on different mobile phones 12 or between similar but different applications on the mobile phones 12. At block 306, overall traffic usage for the applications may be analyzed based on the reports. The traffic management server 40 may apply suitable algorithms and logic to determine relatively high traffic, excessive traffic, unnecessary traffic, and/or traffic that is generated without the user knowing. At block 308, the method 300 may determine whether one or more of the applications and related traffic should be considered for more analysis and traffic management. The traffic management server 40 may identify the applications responsible for relatively high traffic that may cause network saturation or congestion. At block 310, the mobile phones with the determined applications may be sent an option to join a traffic management service to optimize the traffic and network usage by controlling or limiting the traffic.

As such, some of the relatively high traffic on the mobile phones may be reduced (e.g., using the method 200) without affecting user access and experience.

Figure 5:
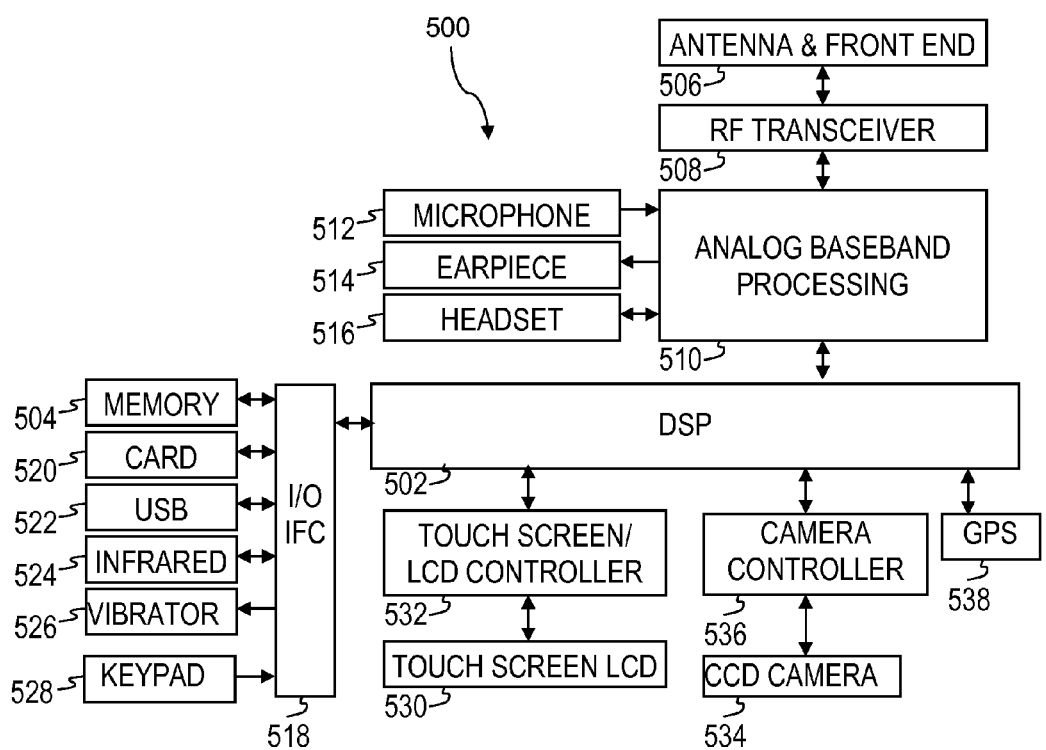
FIG. 5 is a block diagram of a mobile device according to an embodiment of the disclosure.

FIG. 5 shows a block diagram of a mobile device 500. For instance, the mobile device 500 may be implemented in the mobile phone 12 and the mobile phone 112. While a variety of known components of handsets 500 are depicted, in an embodiment a subset of the listed components and/or additional components not listed may be included in the mobile device 500. The mobile device 500 includes a digital signal processor (DSP) 502 and a memory 504. As shown, the mobile device 500 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 500 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 500 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 500 to send and receive information from a radio access network (RAN) or some other available wireless communications network or from a peer mobile device 500. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 500 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 500 to function as a peripheral device to exchange information with a personal computer or other computer system. The infrared port 524 and other optional ports such as a Bluetooth interface or an IEEE 802.11 compliant wireless interface may enable the mobile device 500 to communicate wirelessly with other nearby handsets and/or wireless base stations.

The input/output interface 518 may further connect the DSP 502 to the vibrator 526 that, when triggered, causes the mobile device 500 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 500. Another input mechanism may be the touch screen LCD 530, which may also display text and/or graphics to the user. The touch screen LCD controller 532 couples the DSP 502 to the touch screen LCD 530.

The CCD camera 534 enables the mobile device 500 to take digital pictures. The DSP 502 communicates with the CCD camera 534 via the camera controller 536. The GPS sensor 538 is coupled to the DSP 502 to decode global positioning system signals, thereby enabling the mobile device 500 to determine its position. In another embodiment, a camera operating according to a technology other than charge coupled device cameras may be employed. Various other peripherals also may be included to provide additional functions, e.g., radio and television reception.

Figure 6A:
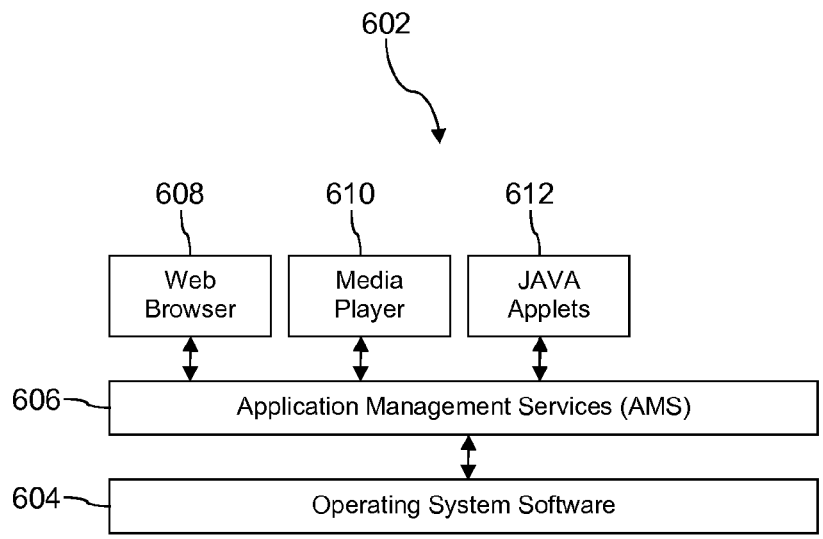
FIG. 6A is a block diagram of a software architecture for a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 500. Also shown in FIG. 6A are a web browser application 608, a media player application 610, JAVA applets 612. The web browser application 608 may be executed by the mobile device 500 to browse content and/or the Internet, for example when the mobile device 500 is coupled to a network via a wireless link. The web browser application 608 may permit a user to enter information into forms and select links to retrieve and view web pages. The media player application 610 may be executed by the mobile device 500 to play audio or audiovisual media. The JAVA applets 612 may be executed by the mobile device 500 to provide a variety of functionality including games, utilities, and other functionality.

Figure 6B:
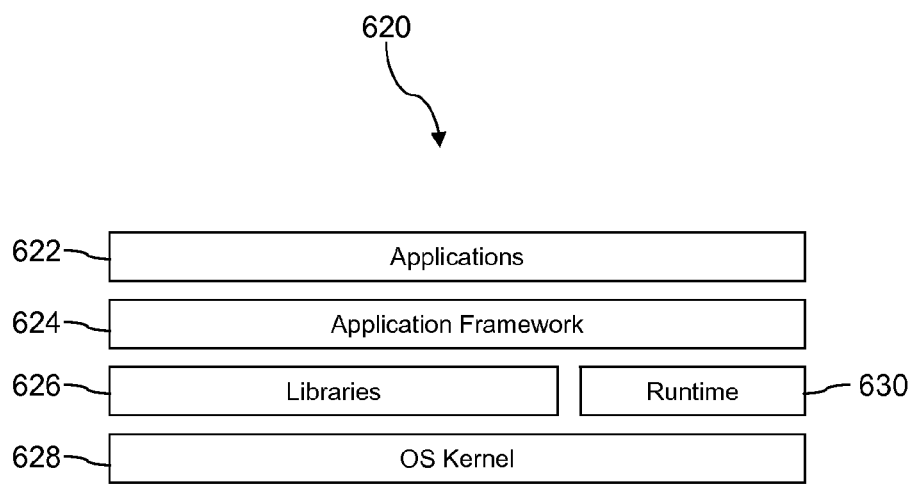
FIG. 6B is a block diagram of another software architecture for a mobile device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
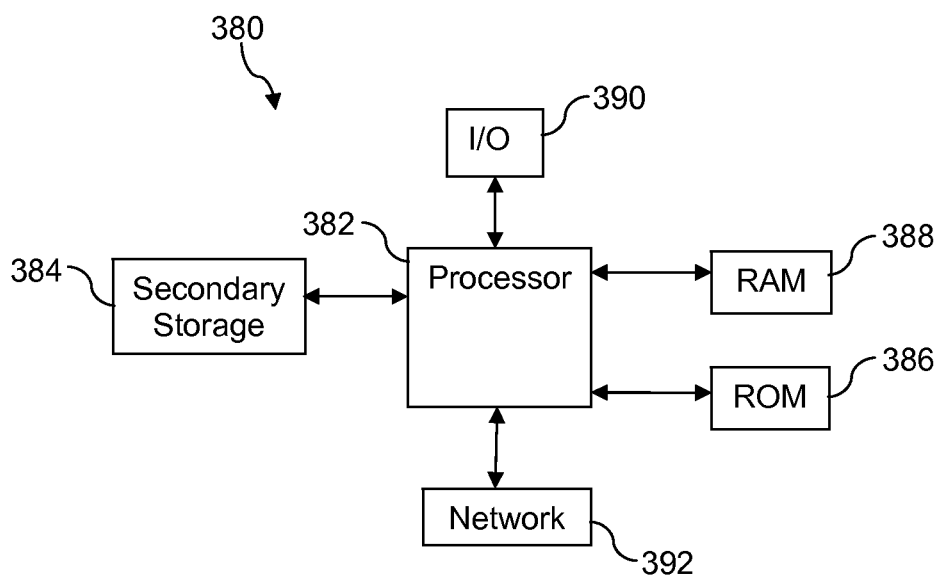
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A proxy server for monitoring and controlling data traffic transmitted to a mobile device from a network, comprising:
   at least one processor;
   a memory; and
   a traffic monitoring application stored in the memory that, when executed by the at least one processor,
      monitors information received from a processor on the mobile device, wherein the information comprises information for a plurality of applications installed on the mobile device and information regarding the data traffic transmitted to each of the plurality of applications on the mobile device;
      assigns a classification to each application of the plurality of applications based on the information received from the processor on the mobile device, wherein each classification includes a threshold for data traffic;
      analyzes the data traffic transmitted to each application of the plurality of applications;
      compares the data traffic for each application to a corresponding threshold for each application;
      in response to the comparison, identifies applications of the plurality of applications that have the data traffic exceeding the corresponding thresholds; and
      selectively blocks or delays the data traffic to the identified applications without interrupting traffic to other applications on the mobile device.

2. The proxy server of claim 1, wherein the identified applications execute in the background on the mobile device.

3. The proxy server of claim 1, wherein the threshold is based on a maximum data rate, a maximum data volume over a time period, or a maximum transmission frequency.

4. The proxy server of claim 1, wherein the traffic monitoring application further:
   monitors a plurality of second applications that run on a second mobile device and the second applications' traffic;
   assigns a classification to each of the plurality of second applications based on information received from a second processor on the second mobile device;
   identifies second applications of the plurality of second applications having data traffic exceeding corresponding thresholds; and
   selectively blocks, delays, or reports the data traffic to the identified second applications without interrupting traffic to other applications on the second mobile device.

5. The proxy server of claim 4, wherein the data traffic for the identified applications on the mobile device and the second identified applications on the second mobile device is blocked or delayed when the mobile device and the second mobile device elect to register with the proxy server for traffic management.

6. The proxy server of claim 1, wherein an Internet Protocol (IP) address is appended to Hypertext Transfer Protocol (HTTP) proxy settings of the mobile device to register the mobile device with the proxy server, and wherein the data traffic is transferred between the mobile device and the network at the proxy server using IP addresses that indicate the plurality of applications for the traffic.

7. A method for managing traffic of a mobile device communicating with a network, comprising:
   monitoring, by a traffic monitoring application executed on a processor, a plurality of applications installed on the mobile device and information regarding data traffic associated with the plurality of applications;
   analyzing, by the traffic monitoring application, the data traffic for the plurality of applications;
   comparing, by the traffic monitoring application, the data traffic for each application of the plurality of applications to a corresponding data traffic threshold for each application;
   in response to the comparison, identifying applications of the plurality of applications that have the data traffic exceeding the corresponding data traffic thresholds; and
   selectively reducing the data traffic for each identified application that is not initiated by the user or that runs in the background without interrupting traffic to other applications on the mobile device.

8. The method of claim 7, wherein the identified applications comprise third party applications provided by a plurality of developers other than a manufacturer of the mobile device or a service provider of the network.

9. The method of claim 7, wherein monitoring the plurality of applications comprises monitoring a number of running applications and an amount of outgoing and incoming data traffic of each of the plurality of applications.

10. The method of claim 7, wherein each of the plurality of applications are monitored during one or more monitored time periods that correspond to peak data traffic periods on the network.

11. The method of claim 7, wherein each of the plurality of applications are monitored during low activity operation conditions of the mobile device, wherein the low activity operation conditions comprise at least one time period when: the mobile device's display screen is turned off, the mobile device's accelerometer shows no movement, the mobile device's battery usage is relatively low, or the mobile device's Wireless Fidelity (WiFi) connectivity is turned off.

12. The method of claim 7, wherein analyzing the data traffic for the plurality of applications comprises:
   aggregating the data traffic for different applications and different monitored time periods to obtain average traffic usage patterns for the plurality of applications on the mobile device; and
   determining an impact of data traffic usage of the plurality of applications on the network.

13. The method of claim 7, wherein reducing the data traffic for the identified applications comprises blocking data traffic for applications on a list of blocked applications, data traffic for applications that do not correspond to a list of allowed applications, or both.

14. The method of claim 7, wherein reducing the data traffic for the identified applications comprises queuing and delaying transmission of the data traffic to reduce the frequency of transmitting the data traffic.

15. The method of claim 7, wherein reducing the data traffic for the identified applications comprises:
   contacting developers of the identified applications to work on improving performance of the identified applications to reduce the data traffic; and
   offering the developers incentives, discouraging the developers, or both to improve the performance of the identified applications.

16. The method of claim 7, wherein the method is implemented by the traffic monitoring application that runs on the mobile device, and wherein the traffic monitoring application is part of an interface and applications pack.

17. The method of claim 7, further comprising: aggregating, by at least one server on the network, data traffic for a plurality of mobile devices and analyzing the data traffic usage for the plurality of mobile devices, wherein analyzing comprises evaluating a load on one or more cell towers.

18. A traffic management server for promoting traffic management between a mobile device and a network, comprising:
   at least one processor;
   a memory; and
   a traffic monitoring application stored in the memory that, when executed by the at least one processor, configures the processor to:
      receive a plurality of reports from a plurality of mobile phones about a plurality of applications that run on the plurality of mobile phones and information regarding data traffic for the plurality of applications;
      aggregate the information in the reports from the plurality of mobile phones;
      analyze overall data traffic usage for the plurality of applications based on the reports;
      determine that applications of the plurality of applications and related data traffic should be considered for more analysis and traffic management;
      in response to the determination that the applications and related traffic should be considered for further analysis and traffic management, send an invitation to the plurality of mobile phones associated with the applications to join a traffic management service to optimize data traffic and network usage by controlling or limiting the data traffic;
      in response to receiving an acceptance of the invitation, compare the data traffic for each application of the applications to a corresponding data traffic threshold for each application;
      in response to the comparison, identify one or more of the applications that have the data traffic exceeding the corresponding data traffic threshold; and
      selectively delay or block the data traffic for each identified application without interrupting traffic to other applications on the plurality of mobile phones.

19. The traffic management server of claim 18, wherein the data traffic for each identified application is managed to reduce data traffic usage without forcing the plurality of mobile phones to switch from a first selected connection into a less secure or more limited connection.

* * * * *